United States Patent [19]
Tsuji et al.

[11] Patent Number: 5,555,047
[45] Date of Patent: Sep. 10, 1996

[54] DATA READING AND WRITING APPARATUS

[75] Inventors: Sadafusa Tsuji, Tondabayashi; Hiroyuki Okada, Sakai, both of Japan

[73] Assignee: Minolta Camera Kabushiki Kaisha, Osaka, Japan

[21] Appl. No.: 245,032

[22] Filed: May 17, 1994

[30] Foreign Application Priority Data

May 18, 1993 [JP] Japan .................. 5-115611
May 18, 1993 [JP] Japan .................. 5-115612

[51] Int. Cl.⁶ .................. G03B 17/24
[52] U.S. Cl. .................. 354/106
[58] Field of Search .................. 354/105, 106, 354/289.1, 289.12

[56] References Cited

U.S. PATENT DOCUMENTS 5,313,235  5/1994  Inoue et al. .................. 354/76
5,335,029  8/1994  Itoh et al. .................. 354/106

FOREIGN PATENT DOCUMENTS 4-349448  12/1992  Japan .
5-61115   3/1993   Japan .

*Primary Examiner*—David M. Gray
*Attorney, Agent, or Firm*—Burns, Doane, Swecker & Mathis, LLP

[57] ABSTRACT

A data reading and writing apparatus reads such data as a photographic mode and the number of prints from a magnetic recording portion of a film. The apparatus can change the data and record the changed data onto the magnetic recording portion of the film.

19 Claims, 9 Drawing Sheets

DATA READING AND WRITING APPARATUS

BACKGROUND OF THE INVENTION

1. Field of the Invention

The present invention relates to a data reading and writing apparatus such as a camera capable of magnetic recording, and more specifically, to a camera capable of magnetic recording which uses film having a magnetic recording portion.

2. Description of the Prior Art

A data reading and writing apparatus such as a camera capable of writing data associated with photographing (e.g. the photographic mode, the number of prints, the shutter speed and the aperture value, hereinafter sometimes referred to as "photographic data") onto a magnetic recording portion provided on film is disclosed by U.S. Pat. No. 4,860,037. The data magnetically recorded on the magnetic recording portion of the film are read out in a laboratory. The photos are printed in accordance with the data.

However, since the data recorded onto the magnetic recording portion by this camera are recorded while the film is being wound or rewound, there are occasions when the data are not normally recorded due to the nonuniformity of film transportation speed caused by variation in battery voltage and the wow-flutter of film transportation caused by low mechanical precision. Therefore, the recording condition of the data written on the magnetic recording portion is not very excellent.

Data readers used in laboratories are designed to be able to read out such abnormally recorded data. However, in order that such abnormally recorded data are normally read out by household readers (such as an apparatus for displaying an image on film on the TV), it is necessary for the household readers to have a data reading performance equal to that of the readers used in laboratories. As a result, the cost of the readers increases.

In digital-recording data, an error correction code is usually added to the data. When the data are read out by using the error correction code, the data can be normally read out even though the signals are partly lost due to drop out. However, if the signal loss increases, it will be impossible to normally read out the data.

Moreover, in the camera of the U.S. Patent, when a user takes a photo believing that the camera is in the normal mode although it is actually in the panorama mode, the data recorded on the magnetic recording portion (hereinafter sometimes referred to as "magnetic data") cannot be changed even though the user notices the error. Moreover, when the number of prints is mis-set, an unnecessary number of pictures are printed.

Japanese Laid-open Patent Application No. H4-349448 proposes a magnetic recorder which modifies photographic data of developed film. This recorder is designed to modify the magnetic data by setting the trimming magnification and date of a frame to be modified and writing them onto the magnetic recording portion of the film.

However, since the magnetic recorder of Japanese Laid-open Patent Application No. H4-349448 is for developed film, the magnetic data cannot be changed before development. Therefore, the photos must be printed even if it is unnecessary.

SUMMARY OF THE INVENTION

An object of the present invention is to provide a camera capable of magnetic recording where magnetic data stored in the magnetic recording portion of film can readily be modified before development.

Another object of the present invention is to provide a data reading/writing apparatus which changes a poor recording condition of magnetic data to an excellent recording condition.

To achieve the above-mentioned objects, according to the present invention, a data reading and writing apparatus for reading and writing a data from and to a film having a magnetic recording portion is provided with the following: an instructor which instructs a change of a data stored on a magnetic recording portion of an arbitrary frame of a film; a reader which reads out the data stored in the magnetic recording portion; and a writer which changes the data whose change is instructed, and records the changed data onto the magnetic recording portion.

Further, according to the present invention, a data reading and writing apparatus for reading and writing a data from and to a recorded medium is provided with the following: a reader which reads out a data recorded on a recording medium; a correcting circuit which corrects an error of the data read out by the reader; and a writer which records the data whose error has been corrected onto the recording medium.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
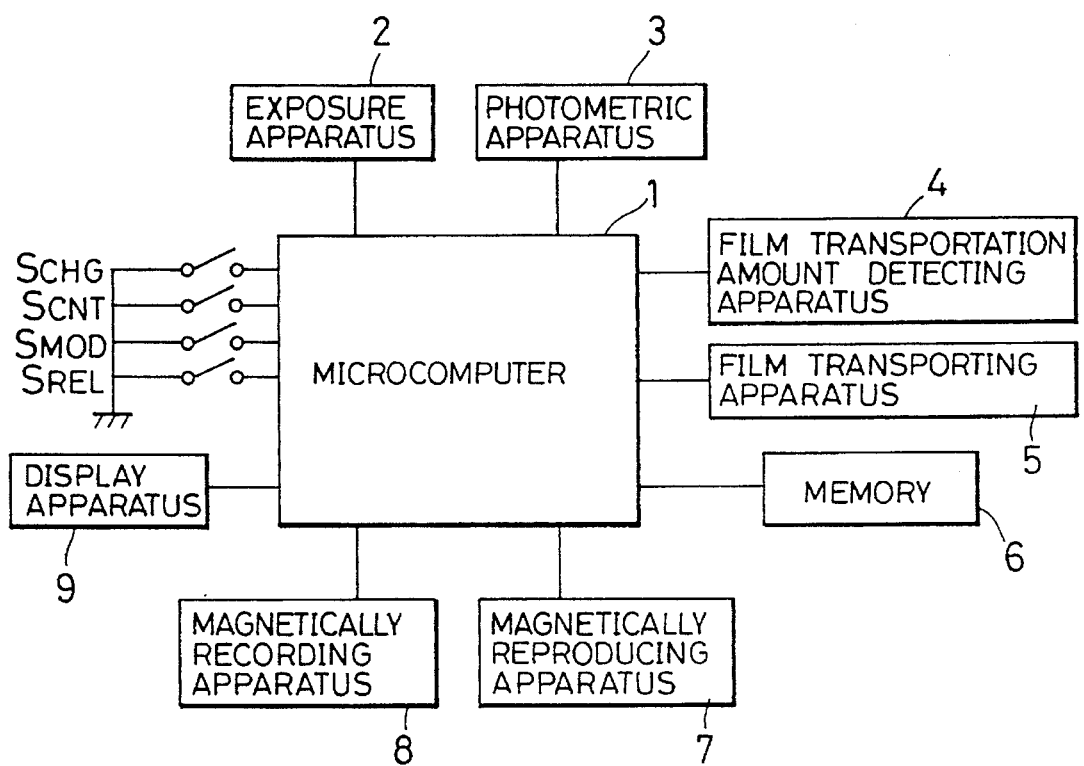
FIG. 1 is a block diagram showing a general arrangement of a first embodiment of the present invention.

Hereinafter, embodiments of the present invention will be described with reference to the drawings. First, a first embodiment of the present invention will be described. This embodiment is directed to a camera capable of magnetic recording which reads and writes (i.e. reproduces and records) photographic data from and onto a magnetic recording portion provided on film. FIG. 1 shows a schematic arrangement thereof.

Referring to FIG. 1, a photometric apparatus 3 measures a subject luminance, and an exposure apparatus 2 controls exposure based on a measured subject luminance. A memory 6 comprises a non-volatile memory which electrically stores the photographic mode and the number of prints included in the photographic data at the time of photographing of each frame of the film.

Figure 2:
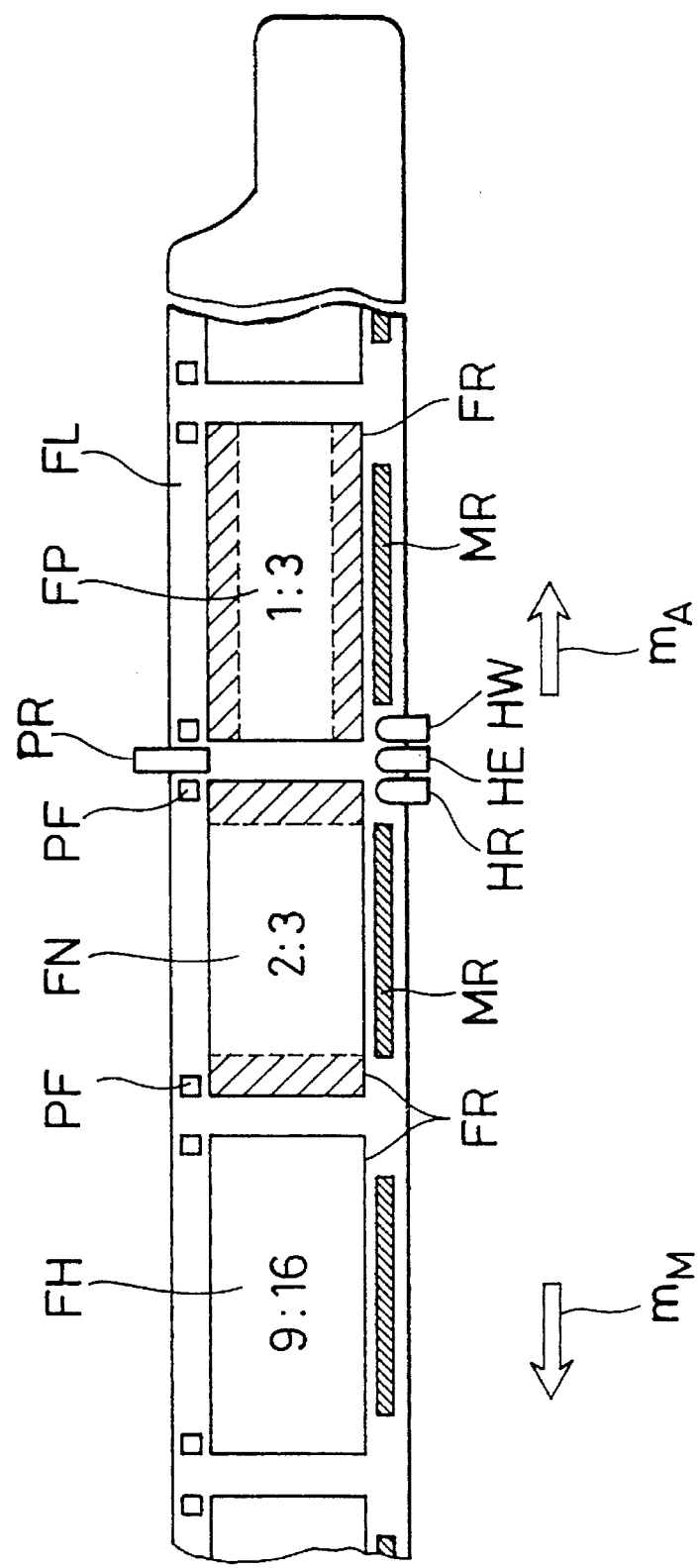
FIG. 2 shows a relationship between a frame of a magnetic recording portion of film and photographic modes used in the embodiments of the present invention.

Referring now to FIG. 2, a film FL usable in the embodiments of the present invention will be described. The film FL has two perforations PF for every frame. The perforations PF, located in the upper left and upper right sides of each frame FR, are used to detect the amount of film movement when the film FL is moved. Specifically, the position of a frame FR of the film FL is sensed by a detector based on the positions of the perforations PF. In FIG. 2, there are provided a non-illustrated film cartridge on the left and a non-illustrated spool on the right. The film FL is transported in the direction of arrow $m_A$ when it is wound and in the direction of arrow $m_M$ when it is rewound.

Below each frame FR where a subject image is formed, a magnetic recording portion MR (indicated by the slanting lines) is provided in correspondence therewith. Onto the magnetic recording portion MR, the photographic data (i.e. the photographing mode, the number of prints, the shutter speed and the aperture value) are magnetically recorded. There are three photographic modes: a high vision mode (width-to-length ratio = 9:16), a normal mode (width-to-length ratio = 2:3) and a panorama mode (width-to-length ratio =1:3). At a laboratory, the magnetically recorded photographic mode data is read out from the magnetic recording portion MR, and the image is printed in a size according to the photographic mode.

Specifically, when the photographic mode is the normal mode, the left and right portions (corresponding to the portions of the central frame FR in FIG. 2 indicated by the slanting lines) of a print area FH for the high vision mode is trimmed, and an area FN is printed. When the photographic mode is the panorama mode, the upper and lower portions (corresponding to the portions of the right frame FR in FIG. 2 indicated by the slanting lines) of the print area FH for the high vision mode is trimmed, and an area FP is printed.

Reverting to FIG. 1, a film transporting apparatus 5 winds and rewinds the film FL. A film transportation amount detecting apparatus 4 comprising the previously-mentioned photoreflector PR (FIG. 2) detects the amount of transportation of the film FL by detecting the perforations PF.

A magnetically recording apparatus 8 records the photographic data (i.e. the photographic mode, the number of prints, the shutter speed and the aperture value) onto the magnetic recording portion MR for each frame FR of the film FL while the film FL is being wound by the film transporting apparatus 5. A magnetically reproducing apparatus 7 reproduces the photographic data (i.e. the photographic mode, the number of prints, the shutter speed and the aperture value) from the magnetic recording portion MR of the film FL while the film FL is being rewound (or wound) by the film transporting apparatus 5. A display apparatus 9 displays the photographic data such as the photographic mode, the number of prints, the shutter speed and the aperture value.

The magnetically recording apparatus 8 comprises an erasing head HE and a writing head HW shown in FIG. 2.

The magnetically reproducing apparatus 7 comprises a reading head HR shown in the figure. For example, assume that the frame FR including the area FN of FIG. 2 is a frame FR to be exposed in the next photographing (i.e. the frame FR located at the head of the frames FR which have not been exposed yet). On the film winding side (right side in FIG. 2) of the magnetic recording portion MR of the frame FR, the reading head HR, the erasing head HE and the writing head HW are arranged in this order from the left. The reading head HR may be arranged at any position relative to the other heads; however, the erasing head HE is necessarily arranged on the left of the writing head HE since the data writing is performed while the film FL is being wound in the direction of arrow $m_A$ as subsequently described.

Figure 3:
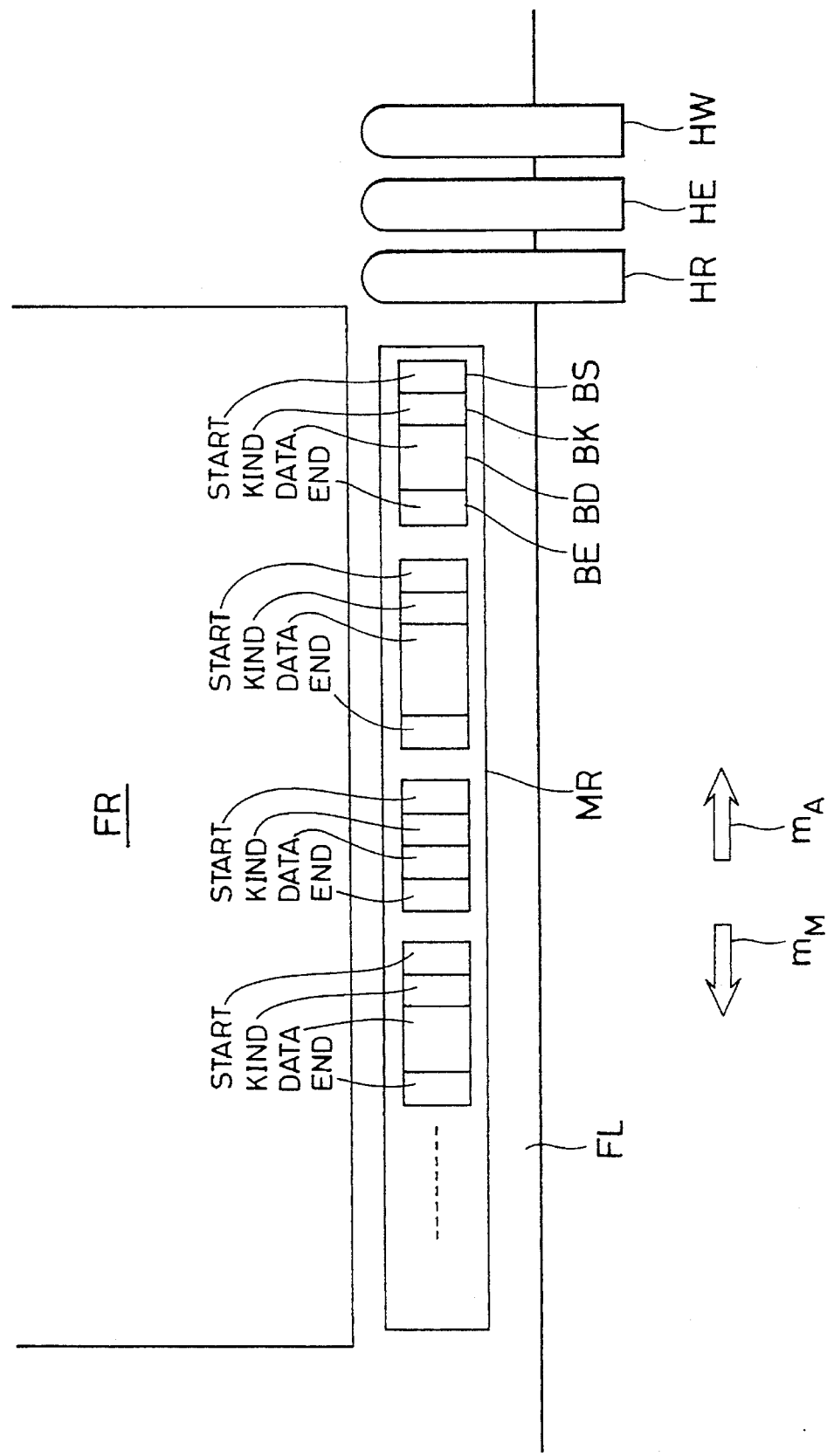
FIG. 3 shows the details of magnetic data recorded on the magnetic recording portion of the film used in the embodiments of the present invention.

Referring to FIG. 3, there are shown the details of the data magnetically recorded onto the magnetic recording portion MR by means of the writing head HW. The magnetically recorded data (the photographic mode, the number of prints, the shutter speed and the aperture value) for one frame FR includes, from the film winding side (right side in FIG. 3), a start bit BS, a data kind discriminating bit BK, a data portion BD and an end bit BE. The magnetically recorded data may further include a date and a comment.

A magnetically recorded data reader used for development in a laboratory first detects the start bit BS to detect the start of the data, and then, it discriminates the kind of the data (i.e. the photographic mode, the number of prints, the shutter speed and the aperture value) by detecting the data kind discriminating bit BK. Then, it reads out the data portion BD succeeding the bit BK, and detects the end of one data included in the magnetically recorded data for one frame by detecting the end bit BE.

Reverting to FIG. 1, a data changing switch $S_{CHG}$ is a switch for instructing a change of a photographic data with respect to a predetermined frame FR of the film FL which has been exposed. This switch is used to rewrite the photographic mode and the number of prints which have been recorded. Switches provided to set the photographic data are a print number setting switch $S_{CNT}$ and a photographic mode selecting switch $S_{MOD}$. The photographic data set by these switches are magnetically recorded onto the magnetic recording portion MR by the previously-described magnetically recording apparatus 8.

The print number setting switch $S_{CNT}$ is a switch for setting the number of prints. By turning it on, the specified number is varied cyclically. To be specific, the number of prints is normally set to 1. It is incremented by one each time the switch $S_{CNT}$ is turned on, and returns to 0 after it reaches 9. It is reset to 1 when photographing is finished. The photographic mode selecting switch $S_{MOD}$ is a switch for setting the photographic mode. By turning it on, the specified photographic mode is varied cyclically. To be specific, the photographic mode is varied cyclically in the order of the high vision mode, the normal mode, the panorama mode and the high vision mode each time the switch $S_{MOD}$ is turned on.

When a release switch $S_{REL}$ is turned on, a sequence of operations including photometry, exposure and film transportation is performed. The data changing switch $S_{CHG}$, the print number setting switch $S_{CNT}$ and the photographic mode selecting switch $S_{MOD}$ are all switches of a type turned on by pressing a button and turned off by releasing the button. Based on the conditions of the switches $S_{CHG}$, $S_{CNT}$, $S_{MOD}$ and $S_{REL}$, a microcomputer 1 controls the previously-described apparatuses and memory.

Figure 4:
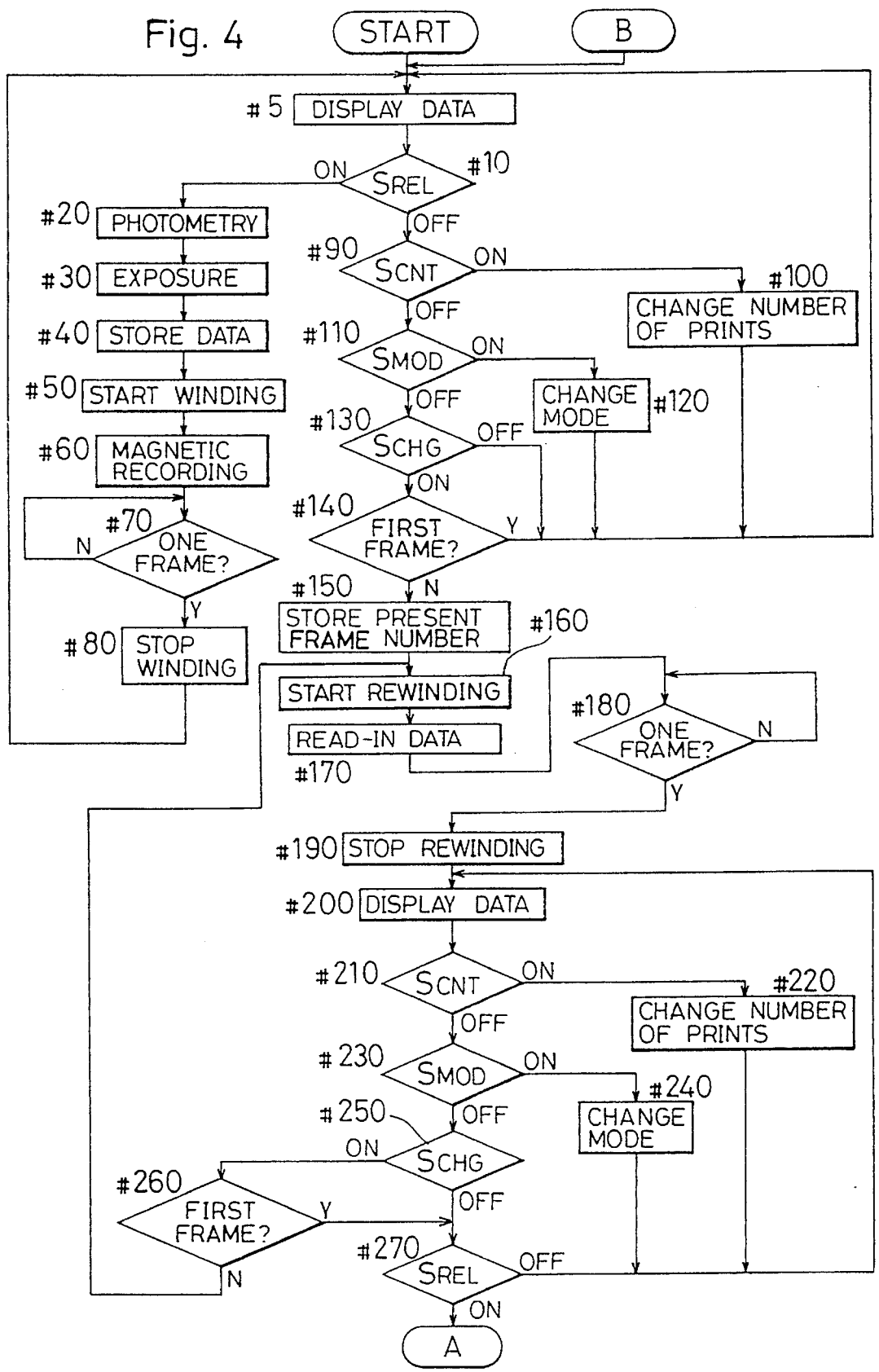
FIG. 4 is a flowchart of a part of a control operation of the first embodiment of the present invention.
Figure 5:
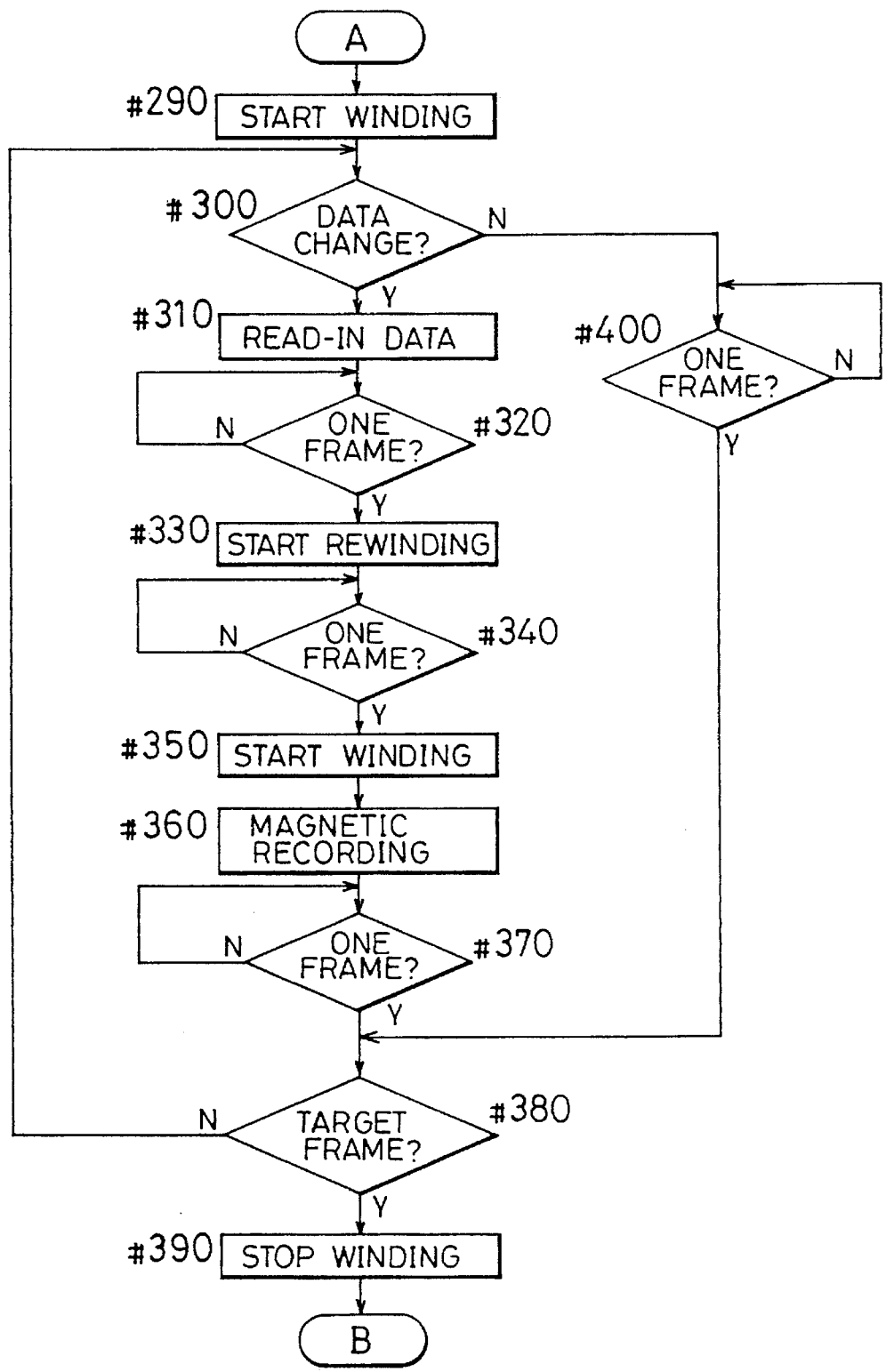
FIG. 5 is a flowchart of another part of the control operation of the first embodiment of the present invention.

Referring now to FIGS. 4 and 5, there are shown flowcharts of a normal operation of the first embodiment. When a power switch (not shown) is turned on, a control operation by the microcomputer 1 is started. When this happens, the frame FR to be exposed in the next photographing is located at a position on which a subject image is projected.

First, at step #5, the photographic mode and the number of prints stored in the memory 6, and the frame number of the frame to be exposed in the next photographing (i.e. data showing which frame is to be exposed in the next photographing) is displayed in the display apparatus 9. The photographic mode and the number of prints displayed at this time may be initially-set data (i.e. the photographic mode is the normal mode and the number of prints is one), or when the power switch is turned on again after it is turned off after a predetermined number of frames have been exposed, they may be data used at the time of the last photographing before the power switch is turned off. The frame number is one when none of the frames has been exposed since the film is loaded. When the power switch is turned off after a predetermined number of frames have been exposed, the frame number is the frame number of a frame to be exposed in the next photographing just before the power switch is turned off. The frame number is detected by the film transportation amount detecting apparatus 4 and stored in the memory 6 before the power switch is turned off. This frame number data is read-in and displayed when the power is activated again.

Then, at step #10, whether the release switch $S_{REL}$ is ON or OFF is determined. When the release switch $S_{REL}$ is ON, photometry (i.e. measurement of a subject luminance) is performed at step #20. Then, exposure is performed based on the subject luminance at step #30.

At step #40, of the photographic data, the photographic mode and the number of prints are stored in the memory 6. The shutter speed and the aperture value are not stored in the memory 6 since it is unnecessary to change them after photographing. However, a shutter speed and an aperture value decided based on the subject luminance measured by the photometric apparatus 3 are stored in a memory provided in the microcomputer 1 since they are magnetically recorded onto the magnetic recording portion MR at a subsequently-described step #60. When the shutter is released again, the data stored in the memory in the microcomputer 1 are erased and new data are stored therein.

Then, at step #50, winding of the film FL is started in the direction of arrow $m_A$ shown in FIGS. 2 and 3. While the film FL is being wound, at step #60, the photographic mode, the number of prints, the shutter speed and the aperture value which are stored in the memory in the microcomputer 1 are magnetically recorded onto the magnetic recording portion MR of the film FL by the magnetically recording apparatus 8. At step #70, whether the winding amount has reached an amount corresponding to one frame or not is detected by the film transportation amount detecting apparatus 4. After the process waits until the winding amount reaches the amount corresponding to one frame, the winding of the film FL is stopped at step #80. Then, the process returns to step #5.

When it is determined at step #10 that the release switch $S_{REL}$ is OFF, whether the print number setting switch $S_{CNT}$ is ON or OFF is determined at step #90. When the print number setting switch $S_{CNT}$ is ON, the number of prints stored in the memory 6 (i.e. the number of prints displayed in the display apparatus 9 at this time) is incremented by one at step #100. Then, the process returns to step #5. When the number of prints stored in the memory 6 is 9, the number of prints is set to 0 as previously mentioned.

When it is determined at step #90 that the print number setting switch $S_{CNT}$ is OFF, whether the photographic mode selecting switch $S_{MOD}$ is ON or OFF is determined at step #110. When the photographic mode selecting switch $S_{MOD}$ is ON, the photographic mode stored in the memory 6 (i.e. the photographic mode displayed in the display apparatus 9 at this time) is changed at step #120. Then, the process returns to step #5.

The processings at the above-described steps #100 and #120 are provided to change, within the memory 6, the data to be written onto the magnetic recording portion MR corresponding to the frame FR to be exposed in the next photographing. They are not provided to change the data recorded on the magnetic recording portion MR corresponding to a frame FR which has already been exposed (for example, when the frame FR including the area FN of FIG. 2 is a frame to be exposed in the next photographing, the frame FR located on the right thereof corresponds to the frame FR which has already been exposed).

When it is determined at step #110 that the photographic mode selecting switch $S_{MOD}$ is OFF, whether the data changing switch $S_{CHG}$ is ON or OFF is determined at step #130. When the data changing switch $S_{CHG}$ is OFF, the process returns to step #5. When it is ON, at step #140, whether the frame FR to be exposed in the next photographing (i.e. the frame FR located at the head of the frames FR which have not been exposed yet) is the first frame of the film FL or not is determined. When it is the first frame, since no frames have been exposed yet, the process returns to step #5. When it is not the first frame, the frame number of the frame to be exposed in the next photographing is stored in the memory 6 at step #150.

Then, at step #160, rewinding of the film FL is started in the direction of arrow $m_M$ shown in FIGS. 2 and 3. While the film FL is being rewound, at step #170, the photographic data (i.e. the photographic mode, the number of prints, the shutter speed and the aperture speed) of the rewound frame FR are read from the magnetic recording portion MR into the memory provided in the microcomputer 1. At this time, since the magnetic data are read by the reading head HR from the side of the end bit BE shown in FIG. 3, the succeeding processing is performed after the signals read-out in the reverse order are rearranged to be in the order starting from the start bit BS in the microcomputer 1.

The reason why the shutter speed and the aperture speed which are not to be changed are read-in together with the photographic mode and the number of prints from the magnetic recording portion MR at step #170 is that the shutter speed and the aperture value are not stored in the memory 6 as previously described. By storing in the memory 6 only a part of the photographic data to be written onto the magnetic recording portion MR, the required memory capacity is reduced.

At step #180, whether the rewinding amount of the film FL has reached an amount corresponding to one frame or not is detected by the film transportation amount detecting apparatus 4. After the process waits until the rewinding amount reaches the amount corresponding to one frame, the rewinding is stopped at step #190. Then, at step #200, the photographic mode, the number of prints, the shutter speed and the aperture value which are read into the memory in the microcomputer 1 are displayed in the display apparatus 9 together with the frame number.

At step #210, whether the print number setting switch $S_{CNT}$ is ON or OFF is determined. When the print number setting switch $S_{CNT}$ is ON, at step #220, the set number of prints displayed in the display apparatus 9 is incremented by one and the new set number of prints is written into the memory 6. Then, the process returns to step #200. Similarly to step #100, the number of prints is set to 0 when the set number of prints is 9. That the number of prints is set to 0 means that no print is necessary. For example, when photographing of a frame is a failure, by setting the number of prints to 0, it is easily prevented that the frame is printed in a laboratory.

When it is determined at step #210 that the print number setting switch $S_{CNT}$ is OFF, whether the photographic mode selecting switch $S_{MOD}$ is ON or OFF is determined at step #230. When the photographic mode selecting switch $S_{MOD}$ is ON, at step #240, the photographic mode displayed in the display apparatus 9 is changed and the new photographic mode is written to the memory 6. Then, the process returns to step #200.

When it is determined at step #230 that the photographic mode selecting switch $S_{MOD}$ is OFF, whether the data changing switch $S_{SCH}$ is ON or OFF is determined at step #250. When the data changing switch $S_{CHG}$ is OFF, the process proceeds to step #270. When it is ON, whether the frame FR with respect to which the data change is being performed is the first frame of the film FL or not is determined at step #260. When it is the first frame, since no frames have been exposed yet, the process proceeds to step #270. When it is not the first frame, the process returns to step #160 to repeat the above-described data change operation. Thus, the frames FR with respect to which no data change is performed are transported (rewound) by one frame each time the switch $S_{CHG}$ is turned on (step #250) without the data thereof being changed.

Then, at step #270, whether the release switch $S_{REL}$ is ON or OFF is determined. When the release switch $S_{REL}$ is OFF, since there is a possibility that the data is further changed, the process returns to step #200. When the release switch $S_{REL}$ is ON, since the data change within the memory 6 is completed, the process proceeds to step #290 (FIG. 5) to start the next sequence of operations performed before the next exposure.

Referring now to FIG. 5, at step #290, winding of the film FL is started in the direction of arrow $m_A$ shown in FIGS. 2 and 3. At step #300, whether the data change has been made or not with respect to a frame FR to be wound from now (the frame number of the frame FR is judged based on a result of the detection by the film transportation amount detecting apparatus 4) is determined. This determination is performed, for example, in the following manner: in the memory 6 where the photographic mode and the number of prints are stored, modification flags are provided so as to correspond to the respective frames FR. The modification flags are set to 1 when the data change has been made (steps #220 and #240) and set to 0 when no data change has been made. At step #300, whether the data change has been made or not is determined based on the modification flags.

When it is determined at step #300 that no data change has been made, whether the film FL has been wound by one frame or not is determined at step #400. Waiting until the film FL is wound by one frame, the process proceeds to step #380. When it is determined at step #300 that the data change has been made, the shutter speed and the aperture value are read from the magnetic recording portion MR of the film FL at step #310 (FIG. 2). In this case, the magnetic data are read-in from the side of the start bit BS by the reading head HR shown in FIG. 3.

At step #320, whether the film FL has been wound by one frame or not is determined. After the process waits until the film FL is wound by one frame, the winding of the film FL is stopped, and rewinding of the film FL is started in the direction of arrow $m_M$ shown in FIGS. 2 and 3 at step #330. When it is determined at step #320 that the film FL has been wound by one frame, reading of the magnetic data (the shutter speed and the aperture value) for one frame has been completed.

Then, at step #340, whether the film FL has been rewound by one frame or not is determined. After the process waits until the film FL is rewound by one frame, the rewinding of the film FL is stopped, and winding of the film FL is started in the direction of arrow $m_A$ shown in FIGS. 2 and 3 at step #350. When it is determined at step #340 that the film FL has been rewound by one frame, the erasing head HE is located on the winding direction (direction of arrow $m_A$) side of the start bit BS of the magnetic data as shown in FIG. 3.

While the film FL is being wound in the direction of arrow $m_A$, at step #360, the data (i.e. the number of prints and the photographic mode read-out from the memory 6 at steps #220 and #240, and the shutter speed and the aperture value read-out from the magnetic recording portion MR at step #310) are written onto the magnetic recording portion MR.

Then, at step #370, whether the film FL has been wound by one frame or not is determined. After the process waits until the film FL is wound by one frame, at step #380, whether or not the film FL has been rewound to a target frame FR stored in the memory 6 at step #150 of FIG. 4 is determined. The reason why the determination of the target frame is not performed until the frames FR with respect to which writing of data change (i.e. data modification) is performed are transported by one frame is that unless one frame is transported, when the process returns from step #380 to step #300, there is a possibility that the process proceeds automatically to step #310 determining that the data change has been made.

When it is determined at step #380 that the film FL has not been wound to the target frame FR, the process returns to step #300. When it is determined at step #380 that the film FL has been wound to the target frame FR, after the winding of the film FL is stopped at step #390, the process returns to step #5 (FIG. 4).

In this embodiment, to reduce the required memory capacity as previously mentioned, only a part of the data (i.e. the photographic mode and the number of prints) to be written onto the magnetic recording portion MR of the film FL are stored in the memory 6. In data writing to modify the data recorded on the magnetic recording portion MR, the magnetic recording is performed after the data (i.e. the shutter speed and the aperture value) are read in the memory. Otherwise, by storing all of the data to be written onto the magnetic recording portion MR in the memory 6, the data reading and the rewinding performed at steps #310 to #350 will be unnecessary.

In this embodiment, the photographic mode and the number of prints are always recorded onto the magnetic recording portion MR when photographing is performed; however, by predetermining, for example, that the photographing mode is the normal mode and the number of prints is one when no such data are recorded on the magnetic recording portion MR, the data writing operation may be omitted under such a photographing condition.

Figure 6:
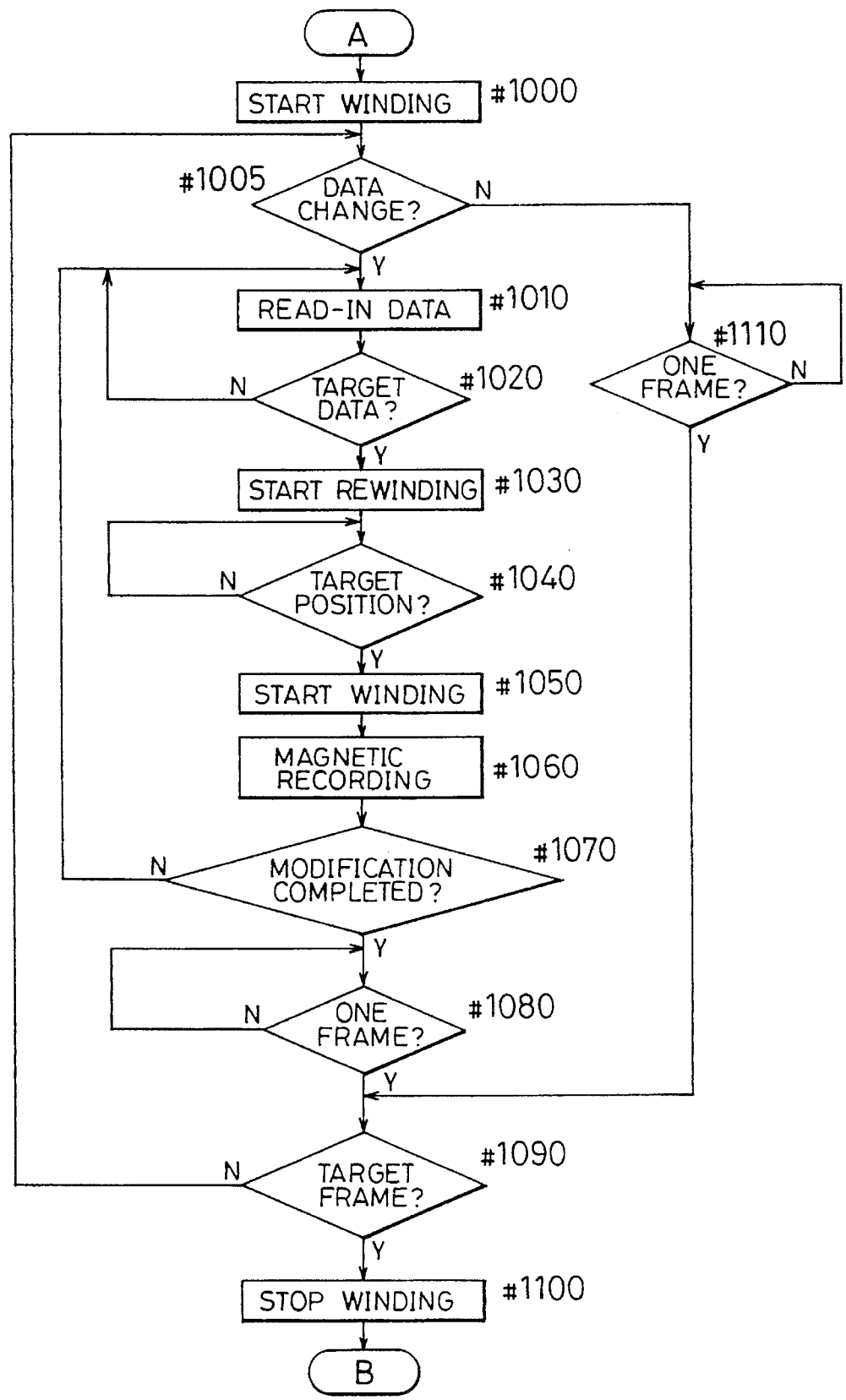
FIG. 6 is a flowchart of a modification of the control operation for data change writing in the first embodiment of the present invention.

Referring to FIG. 6, there is shown a modification of the data change writing control operation (steps #290 to #400) of FIG. 5. As shown in FIG. 3, the magnetic data of each frame FR includes the data portion BD between the start bit BS and the end bit BE in a number corresponding to the number of kinds of the data. In the flowchart of FIG. 5, as previously-described, the magnetic data are all read-in at a time for each frame FR, a necessary portion is rewritten within the memory 6 whether there has been a data change or not, and the data are written-in at a time. On the contrary, in the flowchart of FIG. 6, only a data to be modified is found from among the data recorded on the magnetic recording portion MR of each frame, and only a portion to be modified of the magnetic data for one frame is rewritten for every kind of data.

This processing will hereinafter be described in detail. First, at step #1000, the winding of the film FL is started in the direction of arrow $m_A$ shown in FIGS. 2 and 3. At step #1005, whether or not the frame FR to be wound from now (the frame number of the frame FR is judged based on a result of the detection by the film transportation amount detecting apparatus 4) is a frame FR with respect to which a data change has been made is determined. This determination may be performed in a similar manner to the above-described step #300 of FIG. 5. In this flow, however, it is performed in the following manner. Since the data to be modified are two kinds: the photographic mode and the number of prints, a two-bit data for a change indication is secured for each frame FR, and whether both of the two bits are 0 or at least one of them is 1 is determined. When both are 0, it is determined that there has been no data change, and when at least one of them is 1, it is determined that there has been a data change.

When it is determined at step #1005 that there has been no data change, whether the film FL has been wound by one frame or not is determined at step #1110. After waiting until the film FL is wound by one frame, the process proceeds to step #1090. When it is determined at step #1005 that there has been a data change, the data is read-in kind by kind from the film FL at step #1010 while the winding of the film FL is being continued. In this case, the magnetic data is read in from the side of the start bit BS by the reading head HR shown in FIG. 3.

The magnetic data are read in by the reading head HR in the order of the start bit BS, the data kind discriminating bit BK, the data portion BD and the end bit BE, and whether the data read-in is the data (target data) which has been changed or not is determined at step #1020. This determination is performed in the following manner. As described above at step #1005, since the data to be modified are two kinds: the photographic mode and the number of prints, the two-bit data memory for a change indication is secured for each frame FR. Since, when either of the bits is 1, the frame FR is the frame with respect to which a data change has been made (i.e. either of the photographic mode or the number of prints has been changed), data reproduction is performed while the process waits until a data corresponding thereto is received. When both of the bits are 1, after the modification of the data read-in first is finished, a flag therefor is reset to 0, and the next data is modified in a similar manner and a flag therefor is reset to 0.

Different flags may be used for the determination at step #1005 and for the determination at step #1020. Specifically, one bit is secured in the memory as a flag specifically used to indicate the presence/absence of the data change and two bits are secured in the memory as a modification flag to indicate the target data; the determination at step #1005 is performed by using the flag specifically used to indicate the presence/-absence of the data change and the determination at step #1020 is performed by using the modification flag in a similar manner to the above-described manner.

When it is determined at step #1020 that the data read-in is not the target data, the process returns to step #1010.

When it is determined that the data is the target data, the process proceeds to step #1030, where the winding of the film FL is stopped and the rewinding of the film FL is started in the direction of arrow $m_M$ shown in FIGS. 2 and 3. Data reproduction is performed while the rewinding is being performed, and at step #1040, whether the erasing head HE has reached a target position (i.e. the position of the start bit BE of data to be modified) or not is determined. For example, when the code of the start bit BS is 1011, since 1101 is outputted from the reading head HR, a position at which the erasing head HE is located when the detection thereof is finished is determined to be the target position. The forefront of the data portion BD may be the target position. In this embodiment, however, the film FL is rewound to the position of the start bit BS since positioning is easier. After waiting until the erasing head HE reaches the target position, the process proceeds to step #1050.

At step #1050, the rewinding of the film FL is stopped, and winding of the film FL is started in the direction of arrow $m_A$ shown in FIGS. 2 and 3. While the film FL is being wound in the direction of arrow $m_A$, the modified data is written onto the magnetic recording portion MR at step #1060. At this point of time, the modification of the magnetic data which is the current object of modification is completed. On the completion of this modification, the modification flag is set to 0.

Then, at step #1070, whether the modification for the frame FR which is the current object of modification has all been completed or not is determined. This determination is performed is the following manner. Since the data to be modified are two kinds: the photographic mode and the number of prints as previously described, a two bit data for change indication is secured for each frame FR. However, since the modification is made for one by one, when both have been modified (when the two bits are both 0 at step #1005), it is determined that the data modification has been completed. When it is determined that the data modification has not been completed, the process returns to step #1010. When it is determined that the data modification has been completed, the process proceeds to step #1080.

At steps #1080 to #1100, a processing similar to that performed at the previously-described steps #370 to #390 is performed. Specifically, whether the film FL has been wound by one frame or not is determined at step #1080, and after the process waits until the film FL is wound by one frame, whether the film FL has been wound to a target frame FR stored in the memory 6 (step #150 of FIG. 4) or not is determined at step #1090. When it is determined that the film FL has not been wound to the target frame FR, the process returns to step #1005. When it is determined that the film FL has been wound to the target frame FR, after the winding of the film FL is stopped at step #1100, the process returns to step #5 (FIG. 4).

By fixing the kind of the data and the order of the data writing in advance (for example, to the order of the shutter speed, the aperture value, the photographic mode and the number of prints from the right in FIG. 3), the data reading at step #1010 and the determination at step #1020 will be unnecessary, and accordingly, the rewinding at steps #1030 and #1040 will be unnecessary. As a result, the writing of the modified data (steps #1060 to #1100) can be performed after step #1005.

Moreover, by providing a film transportation amount detecting apparatus capable of controlling the film transportation speed to be constant and of accurately sensing the movement amount of each frame FR, since each data is written onto an accurate position on the magnetic recording portion MR, the detection of position of the modified data by actually reading-in the data (steps #1010 to #1040) will be unnecessary. Different from the film transportation amount detecting apparatus 4 (FIG. 1) comprising the photoreflector PR (FIG. 2) for detecting one frame, the film transportation amount detecting apparatus as mentioned here is capable of detecting the amount of film transportation with a high precision such that it generates a hundred pulses for every frame FR. With this detecting apparatus, it is possible to determine where in one frame a modified data is located based on the number of pulses without any data reproduction. Specifically, this film transportation amount detecting apparatus comprises a photoreflector which generates pulses through the rotation of a rubber roller brought into contact with the film FL.

As described above, one feature of the present invention is that when a user of the camera specifies a data change by means of the data changing switch $S_{CHG}$ with respect to a predetermined frame FR which has already been exposed and thereafter re-sets a predetermined photographic data by means of the photographic mode selecting switch $S_{MOD}$ or the print number setting switch $S_{CNT}$, a control is performed to replace the data recorded on the magnetic recording portion MR with a re-set data by means of the magnetically recording apparatus 8. With this feature, it is easy for the user of the camera to modify the magnetic data recorded on the magnetic recording portion MR of the film FL before the development. Therefore, for example, when photographing is performed with a wrong photographic mode or with a wrong number of prints, the magnetic data is readily modified before printing. Moreover, when photographing of a frame is a failure, the printing of the frame is easily inhibited by setting the number of prints of the frame to 0 by means of the print number setting switch $S_{CNT}$.

Further, since the display apparatus 9 for displaying the data read-out from the magnetic recording portion MR is provided, it is possible to confirm the data recorded on the magnetic recording portion MR before the data change and to confirm the modified data after the data change. As a result, it is unnecessary to re-record data with respect to a frame FR requiring no data change and to write down or remember the details of the data set at the time of photographing each time photographing is performed.

In the above data modification of this embodiment, by enabling the addition of new data and writing the new data onto the film FL at steps #220 and #240 where the data within the memory 6 is changed, it is possible to record data such as a message, a comment and a date after photographing.

Figure 7:
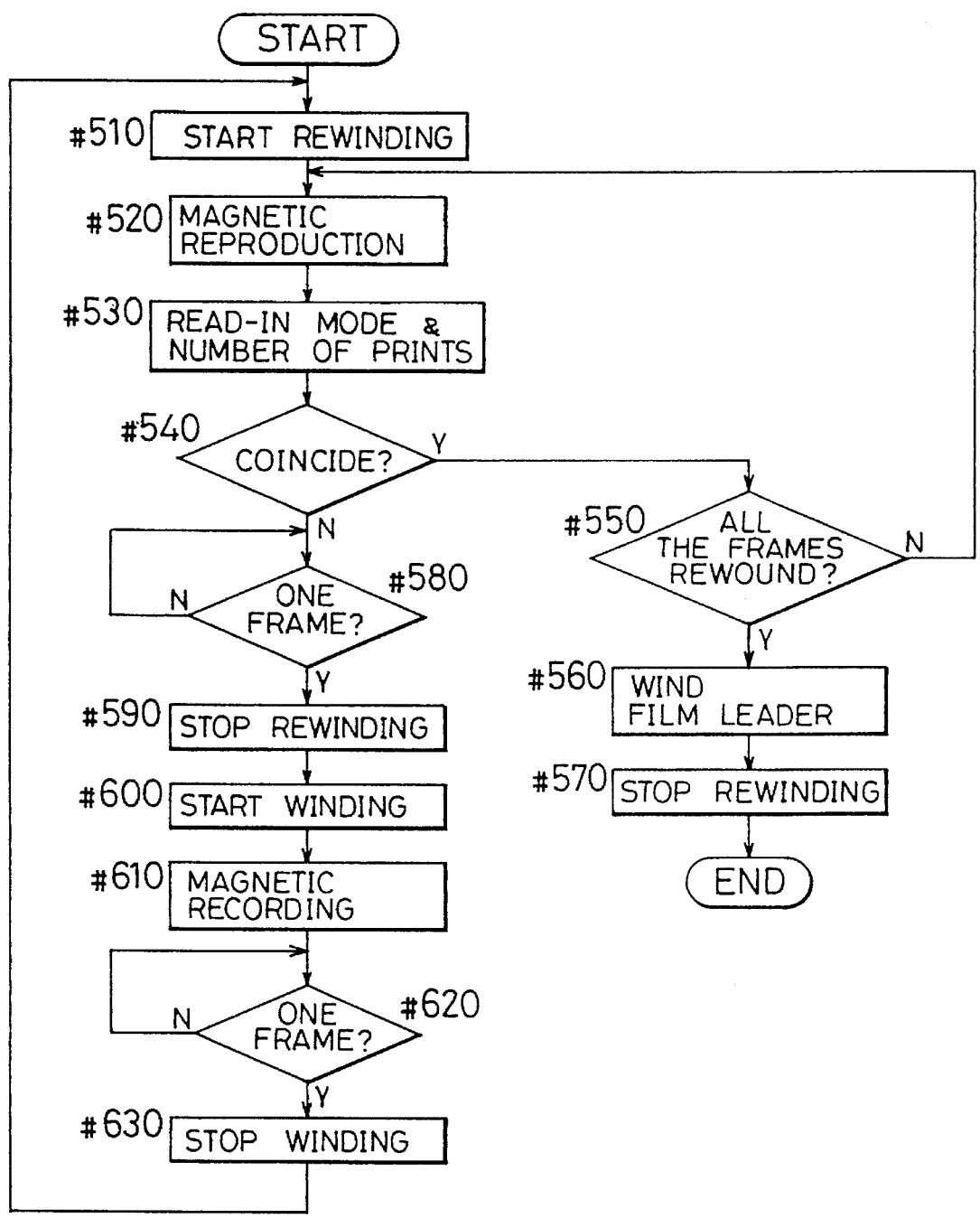
FIG. 7 is a flowchart of a control operation for rewinding exposed film in the first embodiment of the present invention.

Referring to FIG. 7, there is shown a flowchart for the rewinding of the film FL performed after a predetermined number of frames have been exposed. The rewinding of the film FL performed after a predetermined number of frames have been exposed includes the rewinding performed when not all the frames have been exposed as well as the rewinding performed after all the frames have been exposed.

Hereinafter, a control operation for the rewinding of the film FL will be described with reference to the flowchart of FIG. 7. First, at step #510, the rewinding of the film FL is started in the direction of arrow $m_M$ shown in FIGS. 2 and 3.

While the film FL is being rewound, the photographic mode, the number of prints, the shutter speed and the aperture value are read from the magnetic recording portion MR of the film FL into the memory in the microcomputer 1 at step #520. The photographic mode and the number of prints of the frame FR from which the magnetic data are read at step #520 are read from the memory 6 into the memory in the microcomputer 1 at step #530.

At step #540, whether the photographic mode and the number of prints read from the magnetic recording portion MR of the film FL and the photographic mode and the number of prints read from the memory 6 coincide with each other or not is determined. When it is determined that they coincide with each other, the rewinding (including the data confirmation) of all the frames of the film FL that have already been exposed has been completed or not is determined at step #550. This determination is performed based on the frame number detected by the film transportation amount detecting apparatus 4.

When it is determined that the rewinding of all the frames of the film FL has not been completed, the process returns to step #520. When it is determined that the rewinding of all the frames of the film FL has been completed, the process proceeds to step #560, where the remaining part (i.e. film leader) of the film FL is wound into the cartridge (not shown). Then, at step #570, the rewinding of the film FL is stopped to finish the control operation.

When it is determined at step #540 that the photographic mode and the number of prints read from the magnetic recording portion MR of the film FL and the photographic mode and the number of prints read from the memory 6 do not coincide with each other, whether the film FL has been rewound by one frame or not is determined at step #580. Waiting until the film FL is rewound by one frame, the process proceeds to step #590, where the rewinding of the film FL is stopped. Then, at step #600, the winding of the film FL is started in the direction of arrow $m_A$ shown in FIGS. 2 and 3.

While the film FL is being wound, the photographic mode and the number of prints read from the memory 6 at step #530 and the shutter speed and the aperture value read from the magnetic recording portion MR of the film FL at step #520 are magnetically recorded onto the magnetic recording portion MR of the film FL at step #610. The magnetic recording is performed in a manner such that after the data which have already been recorded are erased by the erasing head HE shown in FIGS. 2 and 3, the new data are written by the writing head HW to a location nearly the same as the location where the erased data were recorded. The writing location may be a location nearly the same or substantially the same as the location of the erased data. Then, at step #620, whether the film FL has been wound by one frame or not is determined. Waiting until the film FL is wound by one frame, the process proceeds to step #630, where the winding of the film FL is stopped. Then, the process returns to step #510 to perform the confirmation of the presence/absence of abnormal data writing and the data modification for the next frame FR.

As described above, the data recorded on the magnetic recording portion MR are reproduced by the magnetically reproducing apparatus 7 while the film FL is being rewound, and the reproduced data are compared with the photographic data electrically stored in the memory 6 at the time of the photographing of each frame FR. One feature of this embodiment is that the operation associated with this comparison is performed while the film FL is being rewound by the film transporting apparatus 5 after a predetermined number of frames have been exposed. That is, the confirmation of whether the data are written normally or not is performed collectively to prevent the photographic cycle for one frame from increasing. While in this embodiment, the data recorded on the magnetic recording portion MR are rewritten based on the data stored in the memory 6 in view of a comparison result outputted from the microcomputer 1, a warning signal may be provided or a predetermined operation may be inhibited based on the comparison result.

Subsequently, a second embodiment of the present invention will be described. The second embodiment is directed to a data reading/writing apparatus for reading out the data recorded on the magnetic recording portion MR of the film FL shown in FIGS. 2 and 3 to re-record them. The second embodiment is designed to be used as a reading/writing apparatus for use in apparatuses other than cameras, such as a data reading/writing apparatus used in a laboratory and a reading/writing apparatus for use in a slide projector.

Figure 8:
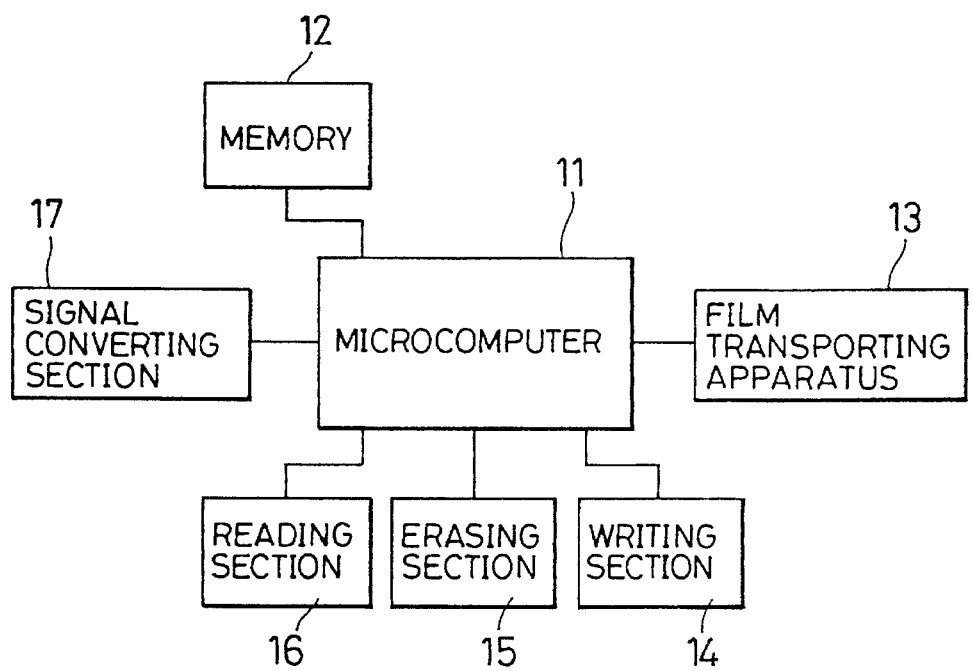
FIG. 8 is a block diagram showing an arrangement of a second embodiment of the present invention.

Referring to FIG. 8, there is shown a block diagram showing a data reading/writing apparatus according to the second embodiment. A microcomputer 11 controls the operations of the elements shown in the figure. A reading section 16 reads out the data digital-recorded on the magnetic recording portion MR of the film FL. The data include photographic data such as the photographic mode, the number of prints, the shutter speed, the aperture value, a date, a comment and a message. An erasing section 15 erases the data recorded on the magnetic recording portion MR of the film FL. A writing section 14 digital-records data onto the magnetic recording portion MR of the film FL. The microcomputer 11 controls the writing section 14 to re-write the data read out by the reading section 16 to a location substantially the same as the location where the data were recorded. A film transporting apparatus 13 transports (i.e. winds and rewinds) the film FL. A memory 12 temporarily stores the data read out from the magnetic recording portion MR of the film FL.

A signal converting section 17 decodes the data read out by the reading section 16 and corrects errors in the data by using an error correction code in reading out the data from the magnetic recording portion MR of the film FL. It encodes the data where error correction has been made and adds an error correction code to the data in digital-recording the data onto the magnetic recording portion MR.

Figure 9:
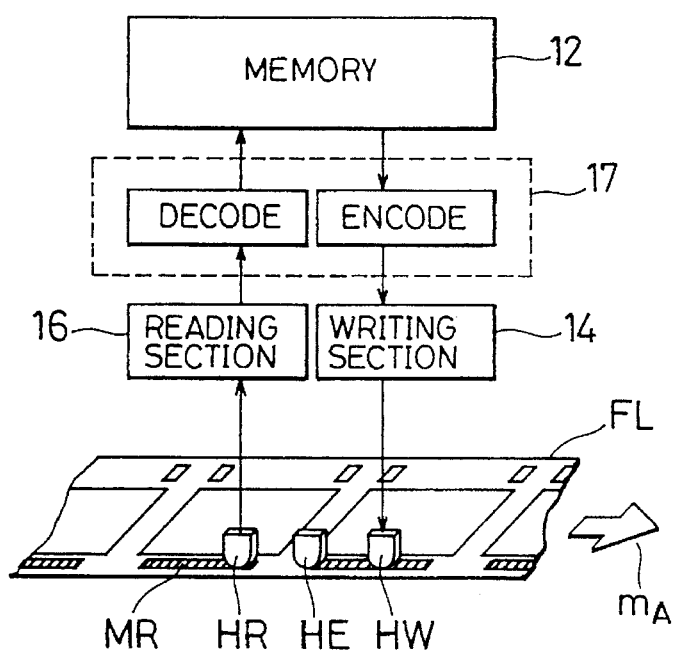
FIG. 9 is a block diagram showing a flow of signals in reading and writing operations in the second embodiment.

Referring to FIG. 9, there is shown a flow of signals in the data reading/writing apparatus. The film FL is moved by the film transporting apparatus 13 relative to the reading head HR, the erasing head HE and the writing head HW which are fixed. The reading section 16 reads out the data from the magnetic recording portion MR while the film FL is being moved in the direction of arrow $m_A$. Since the data are digital-recorded on the magnetic recording portion MR as shown in FIG. 3, the reading head HR reads out the data in the order of the start bit BS, the data kind discriminating bit BK, the data portion BD and the end bit BE.

The magnetic data read out from the magnetic recording portion MR by the reading section 16 is decoded by the signal converting section 17 and stored in the memory 12. Even if incomplete data are read-in due to drop out or a reading error of the magnetic data, the signal converting section 17 corrects the error when it decodes the data. This correction is made according to a known error correction control method. Specifically, the error in the data is corrected, when the data is read out, by using the error correction code added when the data is digital-recorded, thereby enabling the data to be normally read out even if the signals are partly lost due to drop out.

When the magnetic recording portion MR of the film FL whose data have been read out by the reading section 16 reaches the erasing head HE, the data recorded thereon are erased by the erasing head HE. Immediately thereafter, when the magnetic recording portion MR where the data recorded thereon have been erased reaches the writing head HW, the data temporarily stored in the memory 12 are encoded by the signal converting section 17 and re-recorded together with the error correction code onto the magnetic recording portion MR by means of the writing head HW by the writing section 14. The position of the magnetic recording portion MR of each frame FR relative to each head may be detected by an apparatus corresponding to the film transportation amount detecting apparatus 4 of the first embodiment.

The writing is performed to a location substantially the same as the location where the erased data were recorded. In performing the writing, a data stored in the memory 12 in advance may be added to the read-out data.

Apparatuses, such as a reading apparatus (for example, a household slide projector) other than the data reading/writing apparatus for use in laboratories are generally inferior in performance to read magnetic data. According to this embodiment, since the recording condition of poorly recorded magnetic data is improved, magnetic data written by a camera with a low precision are written with a high precision and accurately by a data reading/writing apparatus embodying the present invention in a laboratory. As a result, the reading performances of household slide projectors can be low to thereby reduce the cost. Moreover, the recording condition of film where drop out has already occurred is improved to an excellent recording condition.

Figure 10:
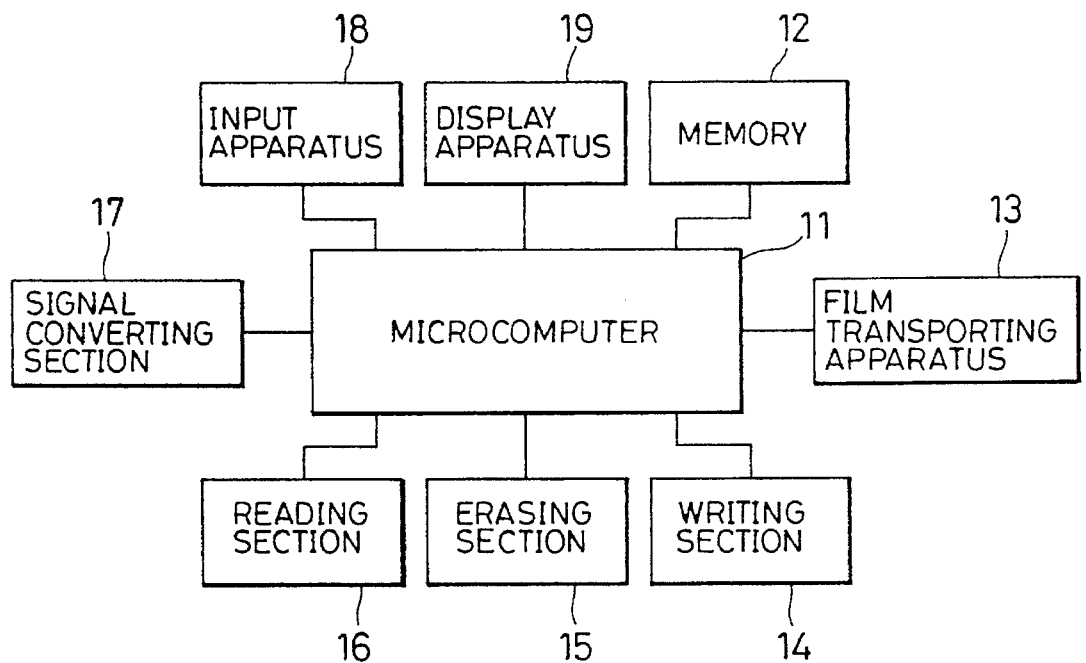
FIG. 10 is a block diagram showing an arrangement of a third embodiment.
Figure 11:
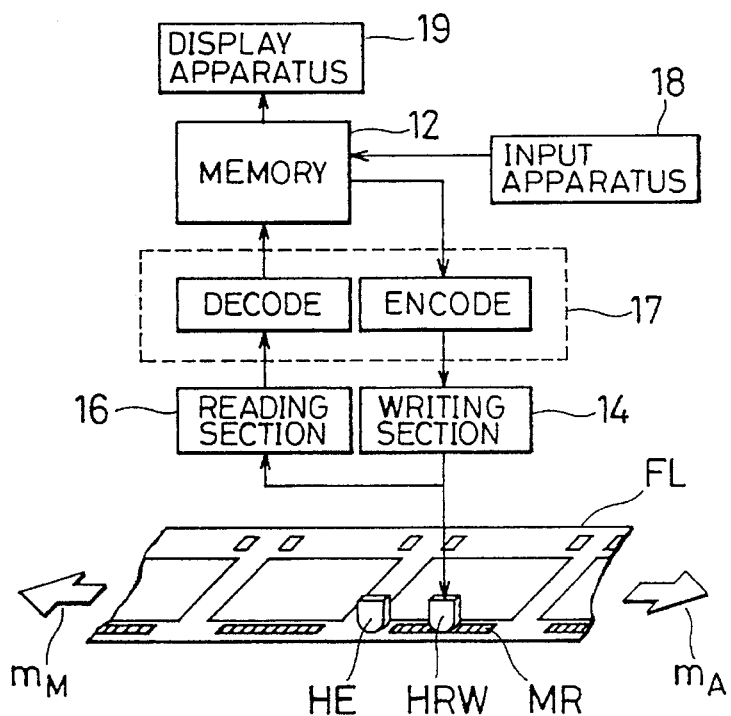
FIG. 11 is a block diagram showing a flow of signals in reading and writing operations in the third embodiment.

Subsequently, a third embodiment of the present invention will be described. Similarly to the second embodiment, the third embodiment is directed to a data reading/writing apparatus for reading out the data recorded on the magnetic recording portion MR (FIGS. 2 and 3) of the film FL to re-record them. As shown in the block diagram of FIG. 10, the third embodiment has an arrangement the same as that of the second embodiment except that an input apparatus 18 and a display apparatus 19 are provided. FIG. 11 shows a flow of signals in this embodiment. The flow of signals is the same as that of the second embodiment except that the input apparatus 18 and the display apparatus 19 are provided and that a reading/writing head HRW used for both reading and writing is provided. The same portions and elements as those of the second embodiment are identified by the same reference designations and detailed description thereof will not be given.

The input apparatus 18 performs the modification of the data read-in from the magnetic recording portion MR of the film FL, the addition of data and the deletion of data. The input apparatus 18 also outputs a signal for instructing the start of data writing. The display apparatus 19 displays data for all the frames read-in from the magnetic recording portion MR of the film FL.

The data reading is performed in the following manner. The film FL is moved by the film transporting apparatus 13 relative to the reading/writing head HRW and the erasing head HE which are fixed. The reading section 16 reads out the data from the magnetic recording portion MR by means of the reading/writing head HRW while the film FL is being moved in the direction of arrow $m_A$. Since the data are digital-recorded on the magnetic recording portion MR as shown in FIG. 3, the reading/writing head HRW reads out the data in the order of the start bit BS, the data kind discriminating bit BK, the data portion BD and the end bit BE.

The data read out from the magnetic recording portion MR by the reading section 16 are decoded by the signal converting section 17, and the data for all the frames of the film FL are stored in the memory 12. Similarly to the second embodiment, even if incomplete data are read-in due to the drop out or reading error of the magnetic data, the signal converting section 17 corrects the error when it decodes the data. The data stored in the memory 12 are displayed in the display apparatus 19. When the reading and display of the data are thus completed, the film FL is rewound in the direction of arrow $m_M$, and the erasing head HE is located on the winding direction $m_A$ side (on the right side in FIG. 11) of the magnetic recording portion MR of the frame FR from which the data reading is started. Then, a signal for instructing the start of data rewriting is waited for to be outputted from the input apparatus 18.

It is possible at this time to perform the modification or the deletion of the data read into the memory 12 and the addition of data by means of the input apparatus 18. To perform the modification, deletion or addition of the data, the frame number of the frame FR with respect to which the modification, addition or deletion of the data is performed, and the details of the modification, addition or deletion are inputted by means of an input apparatus 18 such as a keyboard. The inputted data are stored in memory 12 and displayed in the display apparatus 19 together with not modified data among the read-out data.

For example, when the camera has no function to specify the number of prints, no number of prints is recorded on the magnetic recording portion MR and therefore the frame is printed in a required number (for example, one) in a laboratory. With the present invention, however, the print number data is additionally specified. When the camera has no function to record dates of photographing or comments, these data are also added. Moreover, it is possible to delete these data after photographing. Further, it is possible to arbitrarily modify the magnetic data such as the photographic mode, the number of prints, the shutter speed, the aperture value, a date, a comment and a message.

After the data modification, addition or deletion is performed by means of the input apparatus 18 at need, the start of data writing is instructed to start the winding of the film FL. While the film FL is being wound, first, the old data recorded on the magnetic recording portion MR are erased by the erasing head HE. Then, immediately thereafter, data are written onto locations substantially the same as the locations where the old data were recorded by the writing section 14 by means of the reading/writing head HRW. Specifically, the data for all the frames stored in the memory 12 are encoded by the signal converting section 17 and successively re-recorded onto the magnetic recording portions MR of corresponding frames together with the error correction codes by the writing section 14 by means of the reading/writing head HRW. The position of the magnetic recording portion MR of each frame FR relative to each head may be detected by an apparatus corresponding to the film transportation amount detecting apparatus 4 of the first embodiment.

As described above, while in the second embodiment, signal reading and signal writing are performed in parallel (i.e. writing is performed while reading and correction are being performed), in the third embodiment, data writing is performed after the data for all the frames (for one roll of film) are read in. Therefore, to store data for all the frames read out from the magnetic recording portion MR of the film FL, the memory 12 requires a memory capacity for one roll of film. However, since the reading and the writing are never performed simultaneously, it is possible to integrate the reading head HR and the writing head HW. Otherwise, a head may be provided which has a function of writing and reading. As a result, reduction in size and cost is achieved in addition to the advantages obtained by the second embodiment.

The first and second embodiments are applicable to a minidisk (MD) and a digital compact cassette tape (DCC). In these, since the digital-to-digital dubbing can be performed only once, the signal loss in the dubbed tape can be restored by performing dubbing after converting the data into analog data. However, it is unavoidable that the recording condition of the data slightly deteriorates. Moreover, even though the digital-to-digital dubbing is possible, two reading/writing apparatuses and two discs (or tapes) are required. With the reading/writing apparatuses according to the second and third embodiments of the present invention, however, it is possible to restore the data with no dubbing.

Obviously, many modifications and variations of the present invention are possible in light of the above teachings. It is therefore to be understood that within the scope of the appended claims, the invention may be practiced other than as specifically described.

What is claimed is:

1. A data reading and writing apparatus for reading and writing a data from and to a magnetic recording portion of a film which optically records plural images, comprising:
   a film transport device which transports the film to a predetermined position;
   an instructor which instructs a change of data stored on the magnetic recording portion of an arbitrary frame of the film;
   a reader which reads out the data stored in the magnetic recording portion; and
   a writer which changes the data whose change is instructed, and records the changed data onto the magnetic recording portion.

2. A data reading and writing apparatus as claimed in claim 1, wherein said data reading and writing apparatus is a camera.

3. A data reading and writing apparatus as claimed in claim 1, wherein the change of a data instructed by said instructor includes an addition of a data and a deletion of a data.

4. A data reading and writing apparatus as claimed in claim 1, wherein said reader also reads out another data recorded on the magnetic recording portion on which the data whose change is instructed is recorded and wherein said writer writes said another data together with the changed data.

5. A data reading and writing apparatus as claimed in claim 1, wherein said reader reads out only the data whose change is instructed and wherein said writer writes only the data which is read out and changed.

6. A data reading and writing apparatus for reading and writing a data from and to a recorded medium, comprising:
   a reader which reads out a data recorded on a recording medium;
   a correcting circuit which corrects an error of the data read out by the reader; and
   a writer which records the data whose error has been corrected by the correcting circuit onto the recording medium.

7. A data reading and writing apparatus as claimed in claim 6, wherein said recording medium is a magnetic recording medium.

8. A data reading and writing apparatus as claimed in claim 7, wherein said magnetic recording medium is a photosensitive film having a magnetic recording portion.

9. A data reading and writing apparatus as claimed in claim 7, wherein said data reading and writing apparatus performs reading and writing in parallel.

10. A data reading and writing apparatus as claimed in claim 7, wherein said writer writes all data at a time after errors of all the data are corrected.

11. A data reading and writing apparatus as claimed in claim 6, wherein said recording medium is a photosensitive film having a magnetic recording portion.

12. A data reading and writing apparatus as claimed in claim 11, wherein said data reading and writing apparatus performs reading and writing in parallel.

13. A data reading and writing apparatus as claimed in claim 11, wherein said writer writes all data at a time after errors of all the data are corrected.

14. A data reading and writing apparatus as claimed in claim 11, wherein said writer performs error correction and writing for each frame.

15. A data reading and writing apparatus as claimed in claim 6, wherein said data reading and writing apparatus performs reading and writing in parallel.

16. A data reading and writing apparatus as claimed in claim 6, wherein said writer writes all data at a time after errors of all the data are corrected.

17. A data reading and writing apparatus as claimed in claim 11, wherein said writer writes data of all frames at a time after errors of the data of all the frames are corrected.

18. A data reading and writing apparatus for reading and writing a data from and to a film having a magnetic recording portion, comprising:

an instructor which instructs a change of data stored on the magnetic recording portion of an arbitrary frame of a film;

a reader which reads out the data stored in the magnetic recording portion;

a data changer which changes the data read out by the reader in accordance with an instruction by the instructor; and a writer which records the changed data onto the magnetic recording portion.

19. A camera, comprising:

a reader which reads out a data stored on a magnetic recording portion of a film;

an instructor which instructs a change of the data stored on the magnetic recording portion of an arbitrary frame of the film; and a writer which records the changed data onto the magnetic recording portion.

* * * * *